(12) United States Patent
Redden et al.

(10) Patent No.: US 10,192,112 B2
(45) Date of Patent: Jan. 29, 2019

(54) PLOT GAP IDENTIFICATION

(71) Applicant: Blue River Technology Inc., Sunnyvale, CA (US)

(72) Inventors: Lee Kamp Redden, Stanford, CA (US); James Patrick Ostrowski, Sunnyvale, CA (US); James Willis, Sunnyvale, CA (US); Zeb Wheeler, Sunnyvale, CA (US)

(73) Assignee: Blue River Technology Inc., Sunnyvale, CA (US)

( * ) Notice: Subject to any disclaimer, the term of this patent is extended or adjusted under 35 U.S.C. 154(b) by 113 days.

(21) Appl. No.: 15/341,883

(22) Filed: Nov. 2, 2016

(65) Prior Publication Data

US 2018/0121725 A1    May 3, 2018

(51) Int. Cl.
*G06K 9/00* (2006.01)
*G06T 7/00* (2017.01)
*H04N 7/18* (2006.01)

(52) U.S. Cl.
CPC ........ *G06K 9/00657* (2013.01); *G06T 7/0042* (2013.01); *G06T 7/0081* (2013.01); *G06T 2207/10004* (2013.01)

(58) Field of Classification Search
USPC ....... 382/100, 103, 106, 110, 162, 165, 168, 382/173, 181, 193–194, 199, 209, 214, 382/219–220, 232, 254, 274, 276, 382/286–294, 312; 701/3; 348/89; 56/10.1; 239/172; 800/260
See application file for complete search history.

(56) References Cited

U.S. PATENT DOCUMENTS

| | | | |
|---|---|---|---|
| 5,764,819 A | 6/1998 | On et al. | |
| 6,390,387 B1 * | 5/2002 | Stehling | A01M 7/0064 239/172 |
| 7,058,197 B1 | 6/2006 | McGuire et al. | |
| 9,251,420 B2 | 2/2016 | De Souza et al. | |
| 2001/0000806 A1 | 5/2001 | Carr et al. | |
| 2007/0044445 A1 * | 3/2007 | Spicer | A01G 7/00 56/10.1 |

(Continued)

FOREIGN PATENT DOCUMENTS

EP    3316673 A1    5/2018
WO    WO 2016/090414    6/2016

(Continued)

*Primary Examiner* — Seyed Azarian
(74) *Attorney, Agent, or Firm* — Fenwick & West LLP (57) ABSTRACT

Field data is collected of a field. Each instance of field data contains information that can be used to determine a value corresponding to whether or not a plant is present or absent in a particular location and is referred to as a plant presence value. The plant presence values are aggregated using the position data associated with each instance of field data to generate aggregated plant presence values. Gaps between plots are identified based partly on variations in the plant presence values within the aggregated field data. Information known about a field can be used to heuristically identify gaps in a seed line or used to eliminate locations on a seed line that may look like a gap based on low plant presence values. The aggregated plant presence values can be presented as a heat map of plant presence values showing the relative plant density of the field.

16 Claims, 7 Drawing Sheets

(56) References Cited

U.S. PATENT DOCUMENTS

| | | | |
|---|---|---|---|
| 2013/0066666 A1 | 3/2013 | Anderson, Jr. et al. | |
| 2013/0124055 A1 | 5/2013 | Baurer et al. | |
| 2014/0012732 A1 | 1/2014 | Lindores | |
| 2014/0379228 A1 | 12/2014 | Batcheller et al. | |
| 2015/0015697 A1* | 1/2015 | Redden | G01N 33/0098 348/89 |
| 2015/0264881 A1* | 9/2015 | Langham | A01H 5/10 800/260 |
| 2015/0278640 A1 | 10/2015 | Johnson et al. | |
| 2016/0050840 A1* | 2/2016 | Sauder | A01B 79/005 701/3 |
| 2016/0078570 A1 | 3/2016 | Ethington et al. | |
| 2016/0224703 A1 | 8/2016 | Shriver | |
| 2017/0181372 A1 | 6/2017 | Unruh | |
| 2018/0022208 A1 | 1/2018 | Calleija et al. | |
| 2018/0027725 A1 | 2/2018 | Koutsorodi et al. | |

FOREIGN PATENT DOCUMENTS

| | | |
|---|---|---|
| WO | WO 2016/123656 | 8/2016 |
| WO | WO 2016/191825 | 12/2016 |
| WO | WO 2017/214686 | 12/2017 |

* cited by examiner

PLOT GAP IDENTIFICATION

BACKGROUND

Crop growers plant different seed variants by genotype in individual plots of a field and often record the location of each different seed variant by plot to track, measure, and be able to compare the potentially different growth performances among the different seed variants. In order to measure and compare physiological parameters that determine growth performance, information of the plants or crops at various stages of growth must be collected and accurately mapped to their actual location in the grower's field. Mapping this collected information to a field, however, is not a straightforward process. For example, a grower may record the location of a plot with a positioning system that records slightly different measurements relative to another positioning system used to collect the information, the plot lengths may not be the same length (relative to a recorded theoretical plot length provided by the grower) across all plots in the field, among other variations and anomalies. Further, collection of the information could fail for a portion of the field (e.g., a seed line was inadvertently skipped, etc.) that could inadvertently and incorrectly map information of the plants to incorrect plots, thereby, rending all subsequently collected field data incorrect from that point. Thus, any error however small can result in significant measurement and comparison error in the aggregate across a field.

SUMMARY

Since a grower's position data and/or plot length data can be often unreliable or inconsistent relative to information collected of a field, a field data collection and analysis system delineates the field by identifying individual plots using the collected field data. Field data collection system navigates through or over a field collecting the field data, such as images of plants or crops growing in the field. In order to track and measure the growth of different seed variants, growers plant seeds by genotype and record the location of that genotype in a plot. Thus, the field data can be mapped to the grower's planting records in order to provide the grower with information for the correct genotype and its respective location in the field. As part of the collected information, there will generally be at least some gaps between different genotypes, but gaps may also occur as a result of different growth and germination rates (phenotypes) among the different genotypes. The gaps between plots provide a visual indicator linking the raw field data to an actual plot in the field. For example, if a grower is interested in more information on a first genotype located in a particular plot of a particular seed line (e.g., the 5$^{th}$ plot on the second seed line), the field data can be quickly accessed when segmented into plots as opposed to scrolling through a mass of raw data.

Gaps, in one example, can be defined or characterized by an absence of plants along a seed line (because the grower does not plant in the gaps). By this definition, gaps may inadvertently appear as a result of different growth and germination rates among the different genotypes or other issues with a particular location in the field and so forth. Thus, in order to properly segment and map the field data to an actual location in the field, it can be important to positively identify gaps between plots from potentially false gaps (e.g., areas that look like gaps) and, thus, not confuse or misidentify an area of poor growth in the middle of a plot with a gap between plots, for example.

Accordingly, each instance of field data contains information that can be used to determine a value corresponding to whether or not a plant is present or absent in a particular location and is referred to as a plant presence value. The plant presence values are aggregated using the position data associated with each instance of field data to generate aggregated plant presence values and gaps between plots are identified based partly on variations in the plant presence values within the aggregated field data. Information known about a field can be used to heuristically identify gaps in a seed line or used to eliminate locations on a seed line that may look like a gap based on low plant presence values. The aggregated plant presence values can be presented as a heat map of plant presence values showing the relative plant density of the field.

The figures depict various embodiments of the present invention for purposes of illustration only. One skilled in the art will readily recognize from the following discussion that alternative embodiments of the structures and methods illustrated herein may be employed without departing from the principles described herein.

DETAILED DESCRIPTION

Figure 1:
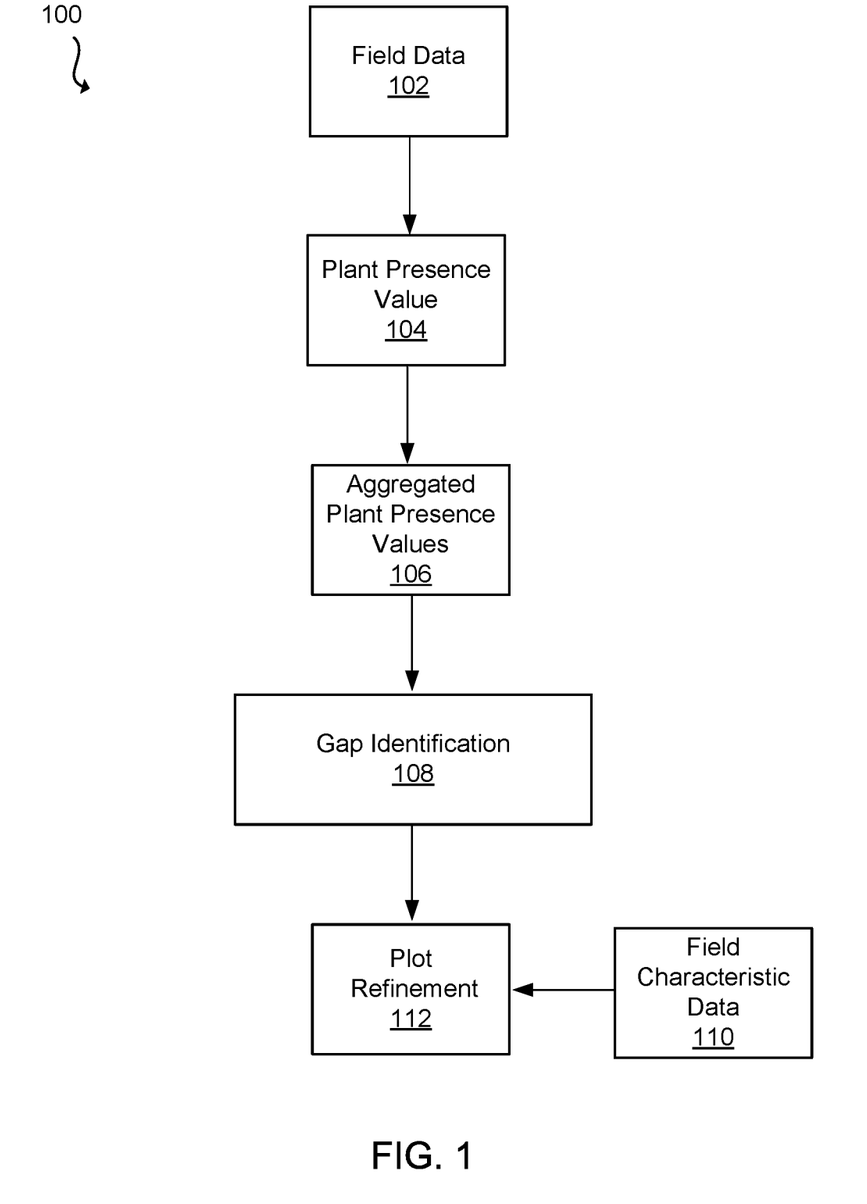
FIG. 1 is a flow diagram for identifying plots of a field using field data captured of a field, in one embodiment.

Since a grower's position data and/or plot length data can be often unreliable or inconsistent relative to information collected of a field, a field data collection and analysis system identifies individual plots in a field. FIG. 1 shows flow diagram 100 for identifying plots of a field using field data collected by a field data collection system, in an embodiment. The field data collection system collects field data 102 of plants or crops in a field using one or more sensors. Each instance of field data 102 contains information that can be used to determine a value corresponding to whether or not a plant is present or absent in a particular location. This value, in various embodiments, is referred to as plant presence value 104 for generally providing a relative indication of the presence or absence of plant matter captured by the field data.

Accordingly, each instance of field data 102 is analyzed to generate plant presence data 104 for the field. Then plant presence values 104 are aggregated using position data associated with each instance of field data 102 to generate aggregated plant presence values 106 and, based partly on variations in the plant presence values within the aggregated field data, gaps between plots are identified. The aggregated plant presence values 106 can be presented as a heat map of plant presence values showing the relative plant density of the field. Accordingly, gap identification 108 is performed to identify candidate gaps between plots by identifying areas of the field associated with low to zero plant presence (e.g., below a plant presence value threshold) in the aggregated plant presence data.

Field characteristic data 110 is information that is known about the field that can be used heuristically to aid in identifying gaps in a seed line, which may also be referred to as a row. Field characteristic data 110 includes data, such as GPS/location/position data for plot and field boundaries, plot length, expected gap length (as planted), seed line length (as planted), direction of seed lines, total number of seed lines and/or plots, stage of growth of plants in a respective plot (since some plots may have been planted before others), type of plant in each plot (since different plants have different growth rates and sizes, and to distinguish desired plants from weeds), how many plots are planted at a particular time (similar to stage of growth), and other field parameters and plant characteristics. Field characteristic data 110 can, thus, be used to eliminate locations on a seed line that may look like a gap when analyzing the plant presence values 104 in isolation.

Accordingly, plot refinement 112 uses field characteristic data 110 to refine the beginning and end of each plot, for example, based on the candidate gaps determined using the aggregated plant presence values 106. For example, the fact that gaps are located at predetermined lengths (e.g., 20 ft) can be used to refine the location that marks the beginning and end of a respective plot. This may help prevent the occasional location where plants are missing on one or more seed lines.

The result of the process illustrated in flow diagram 100 is the identification of real gaps between plots in a field determined by analyzing the field data. The process of flow diagram 100 can be completely automated and performed in real-time or portions can be achieved with user assistance.

Field Data

Figure 2:
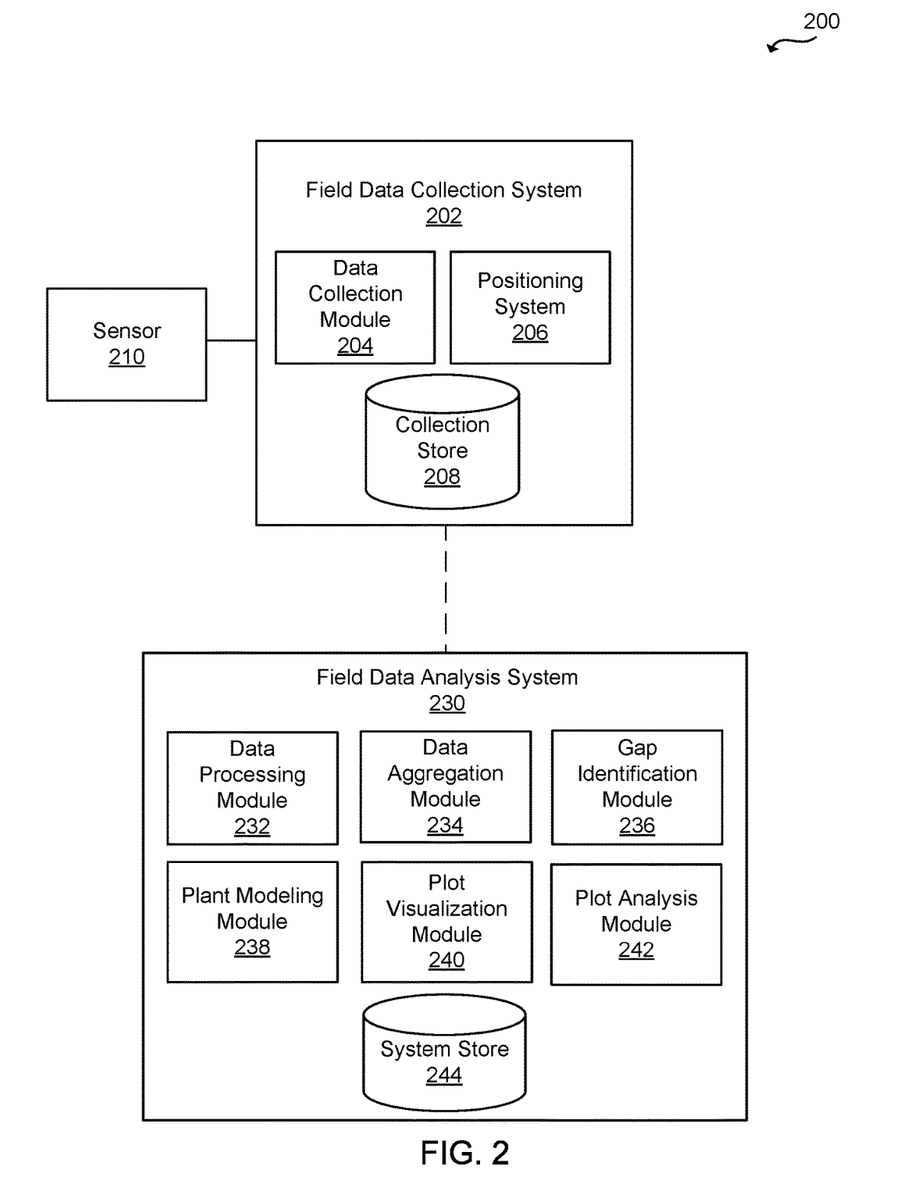
FIG. 2 is a block diagram of a system environment in which gap identification can be performed, in one embodiment.

Field data 102 is collected, captured, or otherwise obtained from a field by a collection system that includes at least one sensor. FIG. 2 is a block diagram of system environment 200 that includes field data collection system 202, in one embodiment. Field data collection system 202 includes data collection module 204, positioning system 206, collection store 208, and sensor 210. In one embodiment, field data collection system 202 is navigated through or over a field while collecting field data 102 using sensor 210.

Positioning system 206 is a navigation system, such as Global Positioning System (GPS), that provides location and/or time information of field data collection system 202 as each instance of field data 102 is collected. The location information is associated with or mapped to an instance of field data 102 corresponding to the location of field data collection system 202 within the field when the instance of field data 102 is collected. Other positioning systems, such as systems using triangulation to determine the location of field data collection system 202 within the field, can alternatively be used.

Data collection module 204 contains logic for collecting field data 102 and additionally receives position data from positioning system 206, associates the position data with each instance of field data 102, and stores field data 102 with the corresponding position data in collection store 208 as field data collection system 202 navigates through the field.

Collection store 208 receives field data 102 with the corresponding positioning data from data collection module 204, stores the field data, and makes the field data available to field data analysis system 230, which will be described further below.

Sensor 210 can be one or more digital cameras, near infrared (IR) cameras, a thermal camera, a plant height sensor (e.g., mechanical sensor or combination image capture and software to identify changes in relative plant heights), a plant stalk detection sensor, and so forth. Imaging data captured by sensor 210 can be multi-spectral or hyper-spectral.

As summarized above, field data 102 is any type of data capable of being used to identify or differentiate individual plants in a seed line captured, collected, or otherwise obtained by sensor 210. For example, field data 102 can be thermal image data, color image data, plant height data, plant volume, and so forth and field data 102 can be multi-spectral or hyper-spectral, a single image or multiple images stitched together captured from above (e.g., from a plane or satellite), among others. Alternatively, field data 102 is any data capable of more generally being used to generate a binary output corresponding to the presence or absence of plants in a location. An individual instance of field data 102 can be granular, representing an individual plant in a location, or more general, representing an area along a seed line that may include two or more plants.

Figure 3:
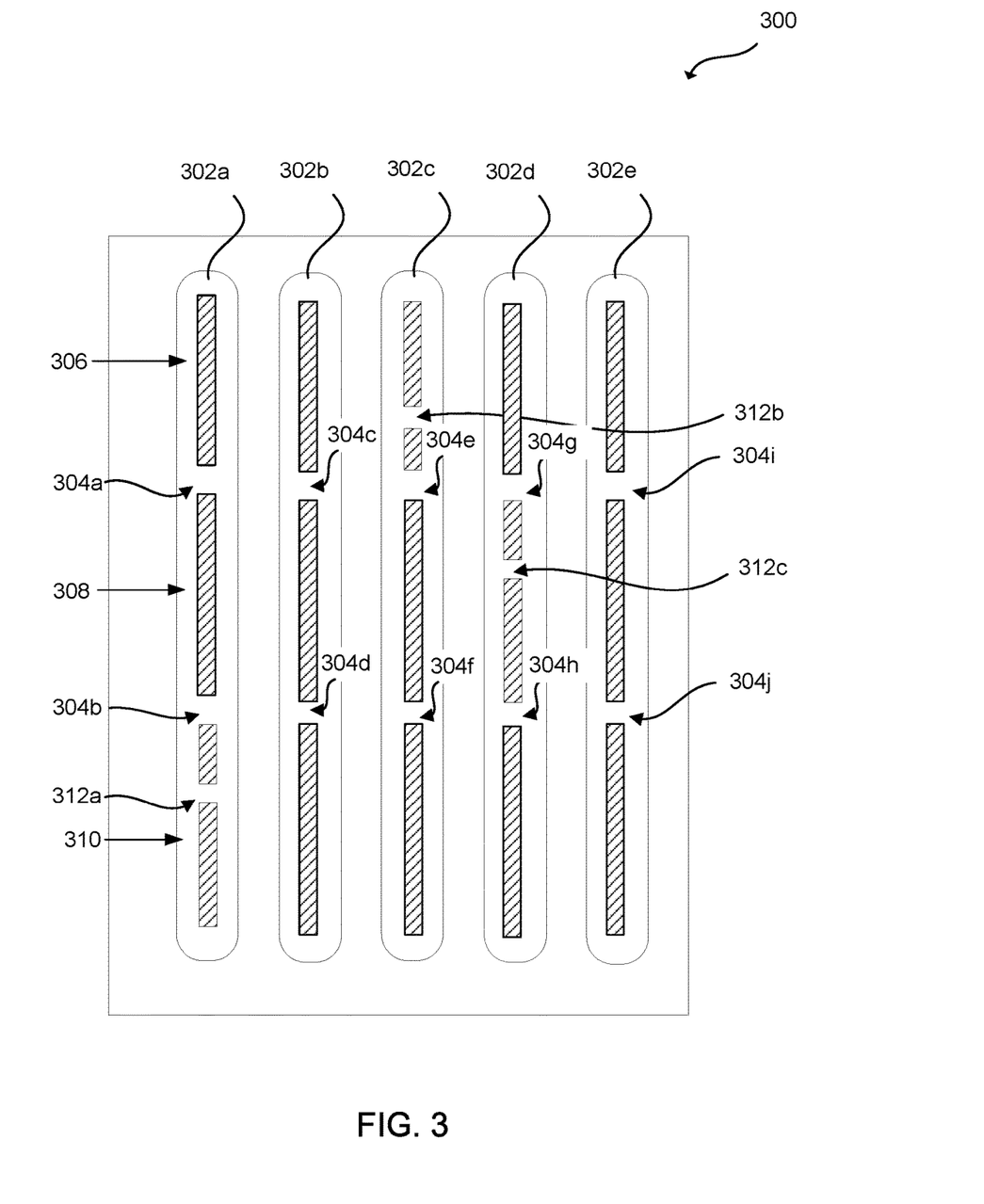
FIG. 3 is an example portion of a field that includes multiple seed lines and multiple plots within each seed line, in one embodiment.

In a field, growers insert gaps between different genotypes of plants and it is common to plant an individual genotype in a single plot separated from adjacent plots by a gap. FIG. 3 is an example portion of field 300 though which field data collection system 202 is navigated to collect field data 102, in one embodiment. Field 300 includes multiple seed lines (302a-302e, collectively "302"), multiple plots (e.g., 306, 308, and 310) within each seed line 302, gaps (304a-304j, collectively "304"), between plots (306, 308, and 310), and false gaps (312a-312c, collectively "312") located in the middle of a few plots (e.g., 310).

Accordingly, field data collection system 202 is navigated through or over field 300 while collecting field data 102 along seed lines 302 via sensor 210. Navigation and drive of field data collection system 202 can be autonomous, performed by a vehicle, such as a tractor, truck, unmanned aerial vehicle (UAV), and so forth. In one example, field data collection system 202 is shrouded to isolate the data collection process to plants along a single seed line and, therefore, eliminate plants in adjacent seed lines from appearing in the data. Additionally, the shroud may provide illumination enabling data collection to be performed at night if necessary.

As described above, many test plots are planted each year to collect data for the growth quality and uniformity of different seed variants at various different stages of growth. To test different seed variants, the growers typically grow the same genotype in a single plot. For example, if a grower were testing the phenotypes of three different genotypes of corn, the grower might plant the first genotypes in plot 306, the second genotypes in plot 308, and the third genotypes in plot 310. In order to isolate each phenotype, the plots (306, 308, and 310) are separated by gaps (304a, 304b) where no plants are planted to isolate each individual phenotype. In this example, plot 306 is separated by plot 308 by gap 304a and plot 308 is separated by plot 310 by gap 304b and the field data can be used to identify gaps (304a-304j) based on variations in the field data and prior known information about field 300.

Gaps, in one example, can be defined or characterized by an absence of plants along a seed line (because the grower does not plant in the gaps). By this definition, gaps may inadvertently appear as a result of different growth and germination rates among the different genotypes or other issues associated with a particular location in a field and so forth. For example, FIG. 3 additionally shows false gaps (312a, 312b, and 312c, collectively "312") in the middle of a plot. False gaps 312 could be the result of soil anomalies, bad seeds, poor soil, insufficient light, areas where seed were inadvertently not sown, and so forth. In order to properly segment and map field data 102 to an actual location in field 300, it is thus important to positively identify real gaps between plots from false gaps 312 and, thus, not confuse or misidentify an area of poor growth in the middle of a plot with a gap between plots, for example.

Misidentifying an area of poor growth in the middle of a plot as a gap can result in an incorrect mapping of the collected field data 102 to plants in field 300. For example, if an instance of the collected field data reflected an area of robust plant growth corresponding to a first seed variant, but was incorrectly mapped to an area of poor or average plant growth corresponding to a second seed variant, the grower would mistakenly conclude the second seed variant as the superior seed variant over the actually superior first seed variant. Thus, an accurate mapping between field data 102 and field 300 is important and an accurate mapping begins with properly identifying gaps 304.

Other than weeds, there are no plants growing (or at least intentionally planted) in gaps 304. Therefore, gaps 304 should have zero to low plant growth relative to the plots each gap separates. With this insight, a metric for the relative desired plant density observable or determinable from field data 102 is defined as plant presence value 104 and the plant presence values of field 300 are determined from the collected field data 102, as described below.

Plant Presence Values

Accordingly, a plant presence value 104 is determined from each instance of field data 102. As briefly described above, each instance of field data 102 contains information that can be used to determine a numerical value corresponding to whether or not a plant is present or absent in a location. This value, in various embodiments, is referred to herein as the "plant presence" value 104 for generally providing a relative indication of the presence or absence of plant matter across field 300 (e.g., degree of plant presence, amount of plant matter, etc.) captured within field data 102. Thus, each instance of field data 102 is processed or analyzed by field data analysis system 230 to generate plant presence data 104 for the field.

Referring to FIG. 2, system environment 200 further includes field data analysis system 230, in one embodiment, and field data analysis system 230 includes data processing module 232. Data processing module 232 receives the collected field data 102 from collection store 208 of field data collection system and determines the plant presence value 104 for each instance of field data 102. The plant presence values can be binary (i.e., there is or is not a plant in this location) or represent a value within a range of values, such as plant height, plant volume, leaf surface area, the number of green pixels in the field data, a ratio of green pixels to brown pixels, and so forth, that represents some measure of an amount of plant growth.

Figure 4A:
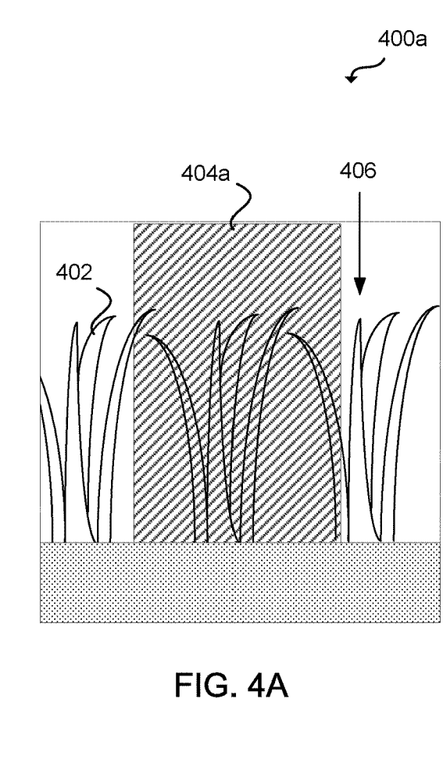
FIGS. 4A-4C show an example sequence of images captured along a seed line, in one embodiment.
Figure 4B:
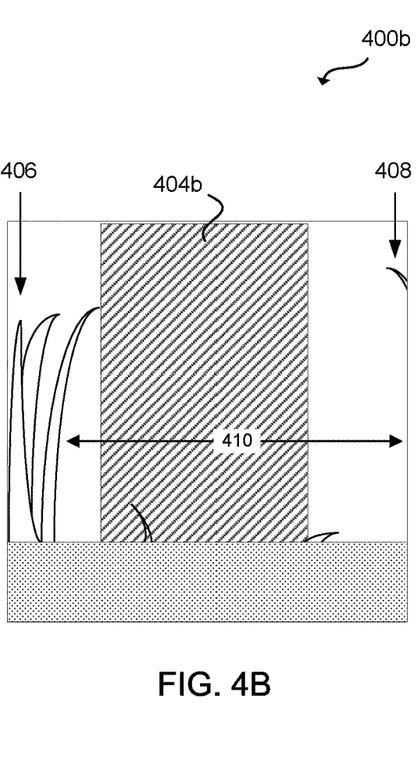
Figure 4C:
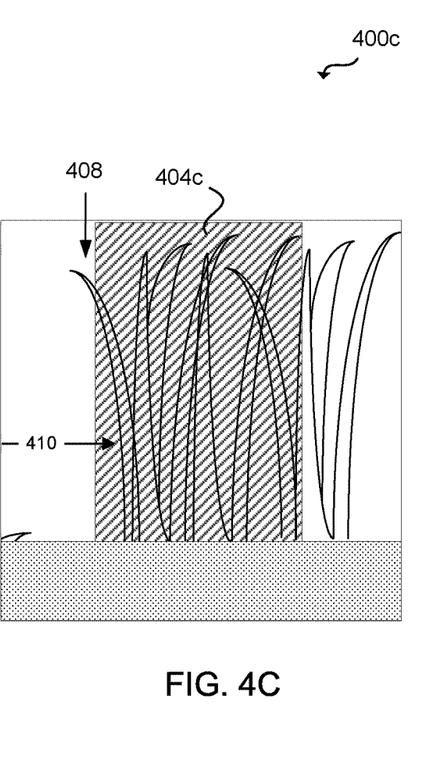

FIGS. 4A-4C show example instances of field data 102 collected along a seed line 302, in one embodiment. In this example, sensor 210 is a camera and each of the instances of field data 102 is an image (400a, 400b, 400c). Accordingly, data processing module 232 analyzes each image (400a, 400b, 400c) to determine the plant presence value 104 for each image (400a, 400b, 400c). In one embodiment, analyzing each instance of field data 102 includes analyzing pixels of images (400a, 400b, 400c) to determine the plant presence value 104 for each of these instances of field data. In one example, the plant presence value 104 for each of these instances of field data 102 is based on the number of green pixels in each of images (400a, 400b, 400c). Additionally, the number of pixels can be normalized (e.g., based on the average, median, max, or other measurement taken across the field) for a particular field (to enable the relative comparison among the different plots).

In one embodiment, each image (400a, 400b, 400c) is cropped or only pixels in central portion (404a, 404b, 404c) of each image (400a, 400b, 400c) are analyzed in an attempt to isolate individual plants 402 in each image. In this example, the plant presence value can be a measure of "greenness", that is, a percentage of green pixels in central portion (404a, 404b, and 404c), a ratio of green pixels to brown pixels, or any other calculation capable of comparing the number of green pixels in an image relative to the number of green pixels in other images of the field. Accordingly, FIGS. 4A-4C each correspond to a different plant presence value. In this example, a first plant presence value is calculated from central portion 404a of image 400a, a second plant presence value is calculated from central portion 404b of image 400b, and a third value is calculated from central portion 404c of image 400c. In this example, image 400c is shown illustrated with the most/tallest plants illustrated therein relative to image 400a and image 400b and, therefore, has the highest plant density and the greatest number of green pixels relative to images 400a and 400b. Thus, the third plant presence value corresponding to image 400c is the highest among images (400a, 400b, 400c). Image 400b shows the lowest plant density (almost zero except for a weed or two) and will, therefore, have the lowest plant presence value among images (400a, 400b, 400c). The second plant presence value is so low, in this example, that it is indicative of a gap (gap 410).

In other implementations, other methods of determining the plant presence value 104 for each instance of field data 102 may be used. For example, other sensor types 210 as introduced above may produce a different kind of information, which may be processed to identify individual plants. For example, LIDAR or image data may be used to generate virtual models of individual plants, in order to identify the presence of unique features of individual plants, such as stalks or bases. These identified stalks or bases may be used to determine which portions of sensor data associated with an instance of field data 102 are associated with a given plant, and therefore associated with the corresponding plant presence value 104. Techniques such as this can be helpful in disambiguating which plant matter is associated with which plant, and therefore, which plant matter is associated with each portion of a plot. More information for using techniques such as this to identify plant unique features can be found in U.S. Provisional Application No. 62/163,147, which is incorporated by reference herein in its entirety. Another alternate implementation for identifying unique plant features using field data 102 captured on per plant basis using image sensors 210 is described U.S. Provisional Application No. 62/279,599.

Yet further methods may be used to identify plant presence value 104. As above, plant height, plant volume, and leaf surface area are all examples of quantities from the field data 102 that may be used to determine the plant presence values. These types of field data 102 may correspond with different types of sensors, which would in turn be associated with different processing routines for determining plant presence values 104 from the raw field data 102. For example, higher plant heights may be associated either with binary plant presence or taller heights may be associated with higher (analog) plant presence values. Plant heights may be gathered using a height sensor, such as a time of flight sensor mounted on a UAV. A correlation function may be used to associate raw plant heights to plant presence values. Similar normalized differential vegetative indices (NDVI) may be used to determine plant volume or leaf surface area, which may in turn be mapped to plant presence values using an appropriate correlation function.

Often the field will contain weeds alongside the plants of interest. The data processing module 232 is further configured to determine plant presence values that are based only on plants of interest, and which do not factor in the presence of weeds. Consequently, the presence of field data 102 indicating weeds may either be eliminated from inclusion in the plant presence values 104 or it may be associated with a separate plant presence value (referred to as a weed plant presence value for clarity) stored separately in association with the field data 102 and that location in the field.

Various techniques may be used to process field data 102 so as to separately identify weed presence for tabulation of the correct "desired" plant presence value and/or the weed plant presence value. In one embodiment, plant modeling techniques such as those identified in U.S. Provisional Applications Nos. 62/163,147 and 62/279,599, as incorporated herein, can be used to model plant structures and identify individual plants. The individual plant models can be used to identify features associated with the plants, and discriminate desired plants vs. weeds using plant-specific properties derived from the virtual plant models.

Further, depending upon the type of sensors 210 used to capture the field data 102, the field data 102 itself may provide information that allows discrimination between desired plants and weeds. For example, plant colors, plant heights, plant leaf area index, plant volume, and other observable quantities may be identifiably different in the field data 102 between desired plants and weeds, and can accordingly be used to eliminate or de-weight some instances of field data from contributing to desired plant presence values.

Plant presence values 104 are subsequently aggregated for at least a portion of field 300 as described in the next section. The remainder of this discussion discusses only plant presence values 104 generally, however in practice this may include all plants, a subset of plants of interest (or plant of interest), weeds or other non-desirables, etc., depending upon the implementation.

Plant Presence Value Aggregation

Aggregating plant presence values 104 allows for relative comparison of the plant presence values and for the identification of patterns in the plant presence values 104 that are reminiscent of gaps (areas associated with low plant presence values) between plots (areas associated with high plant presence values). Plant presence values 104 for field 300 are aggregated according to their location in field 300 using the position data associated with each corresponding instance of field data 102 to generate aggregated plant presence values 106. Referring to FIG. 2, field data analysis system 230 further includes data aggregation module 234, in one embodiment, that aggregates plant presence values 106 to identify sections within seed lines 302 that have relatively low plant presence values. Areas of field 300 that have relatively low plant presence values are one characteristic of gaps between plots and are identified for further analysis.

Figure 5:
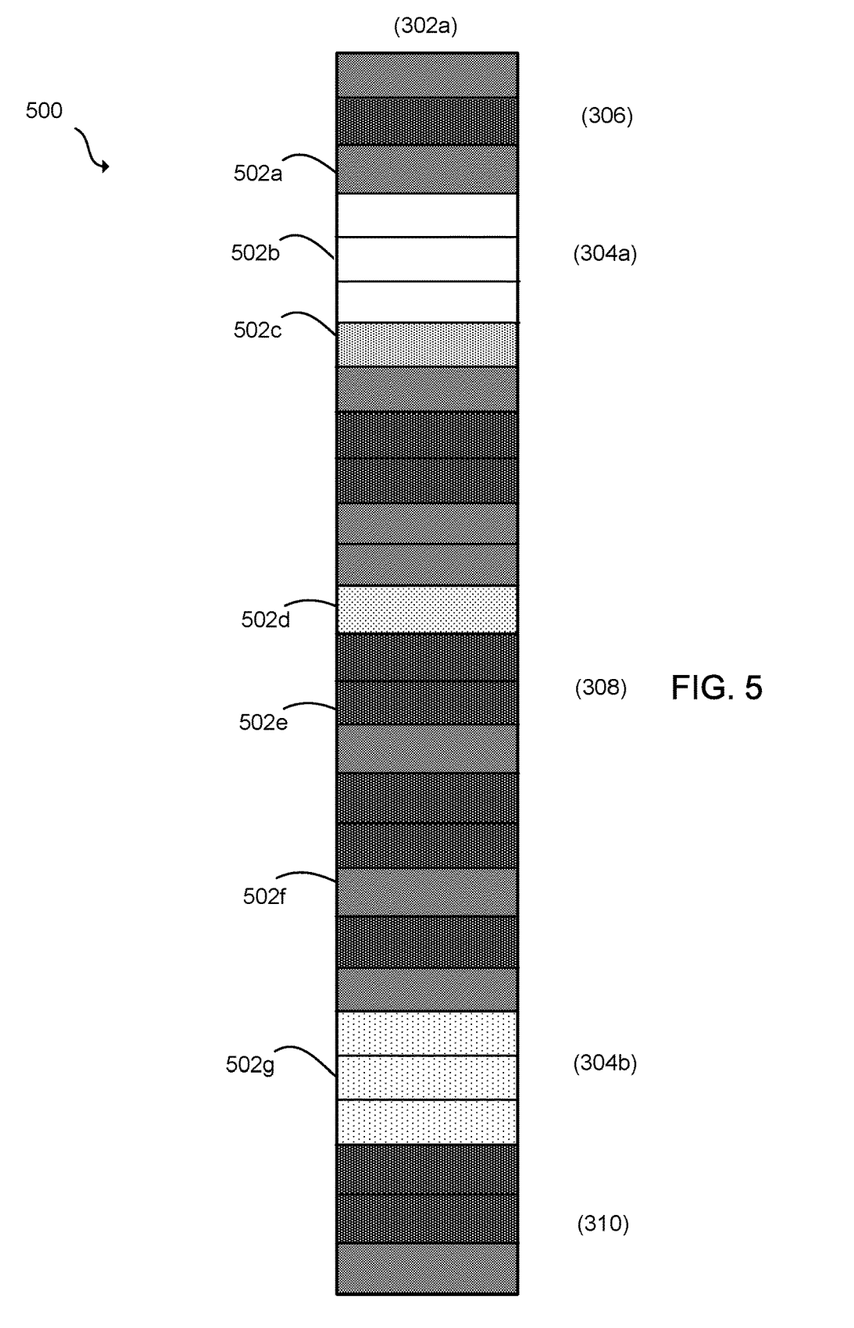
FIG. 5 shows an example plant presence heat map for individual plants of a field, in one embodiment.

In one embodiment, the plant presence values are aggregated into a scaled plant presence heat map composed of each individual plant presence value 104 for field 300. FIG. 5 shows an example plant presence heat map 500 for seed line 302a from FIG. 3, in one embodiment. Thus, field data collection system 202 has obtained field data 102 for seed line 302a, a plant presence value 104 for each instance of field data 102 along seed line 302a has been determined and subsequently aggregated using the position data to generate plant presence heat map 500. Accordingly, heat map 500 is composed of a set of plant presence values 102 that include individual plant presence values (502a, 502b, 502c, 502d, 502e, 502f, and 502g, collectively "502") each corresponding to an individual instance of field data 102 along seed line 302a.

Plant presence heat map 500 represents plant density along seed line 302a and the different shades of plant presence heat map 500 represent different plant presence values. Plant presence values 502 may correspond to individual plants, multiple plants, a predefined length (e.g., 2 feet, 1 meter, etc.) along a seed line, and so forth. In this example, dark plant presence values correspond to areas of relatively high plant presence or areas of robust plant growth and light values correspond to areas of low plant presence. At least some of the areas of low plant presence are gaps.

In this example, plant presence value 502b is the lightest of plant presence values 502 and is adjacent to two plant presence values with the same value, which may correspond to a gap. Similarly, 502g is also a relatively low plant presence value with two adjacent low plant presence values of the same value. Additionally, plant presence value 502d is also relatively low compared to other plant presence values 502. At this point in the process, the three areas in field 300 corresponding to plant presence values 502b, 502d, and 502g could be actual gaps, an area associated with bad seeds, a soil anomaly, or other issue effecting plant growth in these locations. In this example, plant presence value 502b corresponds to gap 304a between plot 306 and plot 308 and plant presence value 502g corresponds to gap 304b between plot 308 and plot 310, although this determination has yet to be made at this point in the process. Conversely, plant presence value 502e is equal to the darkest plant presence values 502 along seed line 302a and is indicative of an area of robust plant growth.

Gap Identification

Areas associated with low to zero or low plant presence in aggregated plant presence data 106 (e.g., heat map 500) are used to identify gaps 304 between adjacent plots along seed lines 302. Referring to FIG. 2, field data analysis system 230 further includes, in one embodiment, gap identification module 236 that identifies gaps between plots based on plant presence values that are associated with or empirically correspond to a gap (e.g., below a plant presence value threshold). The plant presence value threshold can be a value set empirically by a user which may vary based on plant/crop type, phenotype/genotype, stage of growth, and so forth. Alternatively, the plant presence value threshold can be based on the plant presence values of the field itself, such as being below an average plant presence value for the whole field (or a subset of the field), some percent of the average, and so forth.

Figure 6:
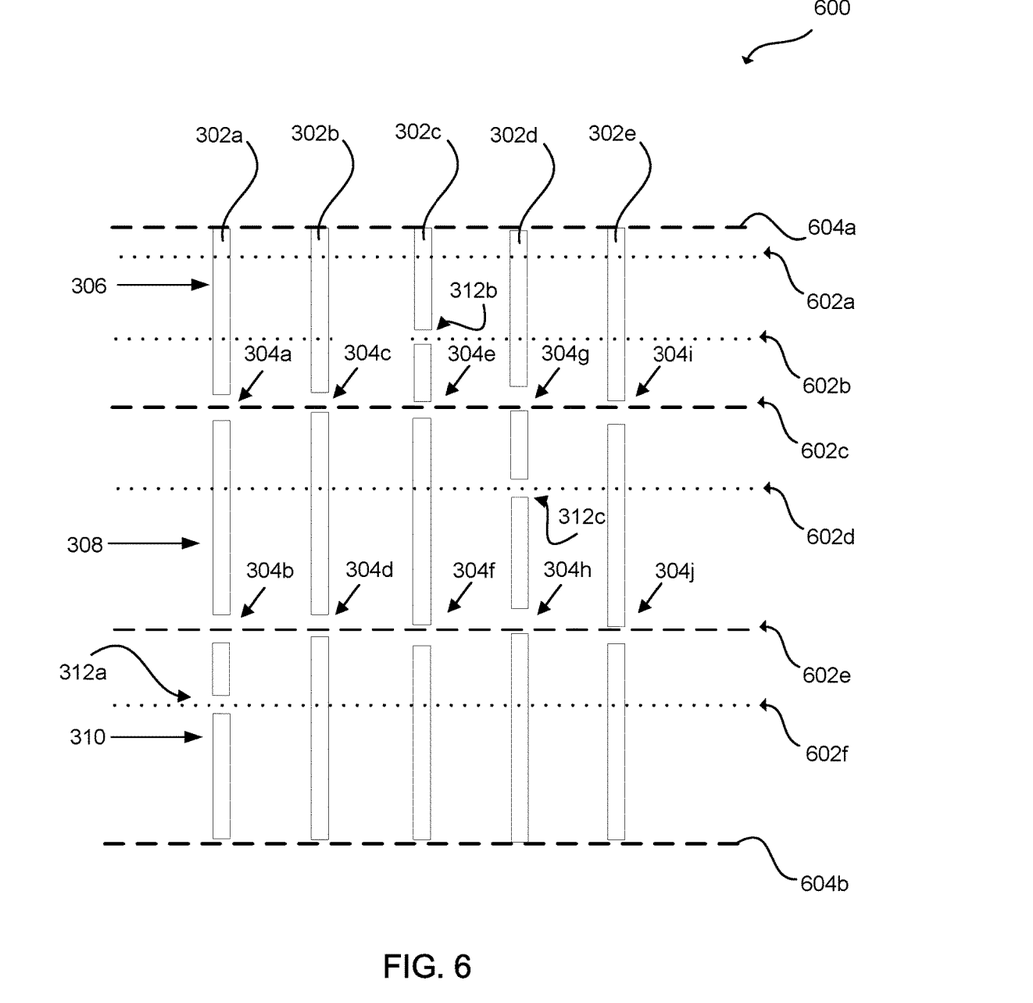
FIG. 6 shows an example of determining gaps from plant presence values, in one embodiment.

FIG. 6 shows an example process 600 for identifying gaps from plant presence values 104, in one embodiment. In many fields, plots and the gaps between them typically have the same length, are planted in parallel columns (or rows depending on chosen perspective), and begin from the same starting line or edge of a field. This feature, common to many fields, results in gaps 304 of adjacent seed lines 302 lining up (or being aligned) perpendicularly across seed lines 302, as shown in FIG. 6. Since gaps 304 are expected to line up and there are no plants at least intentionally planted in those gaps, the average plant presence value for a row across field 300 (i.e., perpendicular to seed lines 302) where the gaps 304 are aligned is substantially lower relative to those of other rows perpendicular to seed lines 302 and also to the average plant presence value for the field (or subset of the field where the crop in question has been planted).

FIG. 6 shows rows (602a-602f, collectively "602") as dashed lines perpendicularly traversing field 300 across each seed line 302 and can be defined as one or more plant presence values, a unit length of field 300 (e.g., each row corresponds to a meter of the length of field 300), or some other unit/metric. FIG. 6 also shows dashed lines corresponding to field boundaries 604 (i.e., a beginning 604a and an end 604b of the seed lines 302). Accordingly, the average plant presence value for a given row 602 is the average of one or more plant presence values from seed line 302a, seed line 302b, seed line 302c, seed line 302d, and seed line 302e on that row, in this example. As shown in FIG. 6, row 602a traverses field 300 in the middle of plots of each seed line 302 and will, therefore, have a higher than average plant presence value compared to the field average plant presence value that includes gaps. Similarly, row 602b traverses field 300 in the middle of plots of each seed line 302; however, row 602b additionally traverses through false gap 312. Here, false gap 312 lowers the average plant presence value of row 602b relative to row 602a, for example, but the average plant presence value of row 602b is still much higher relative to a row of gap plant presence values near zero, such as row 602c. Further, in this example, row 602d and row 602f traverse field 300 across plots, but each traverse through a false gap (312a, 312b) and row 602e is aligned with gaps (304b, 304d, 304f, 304h, and 304j) of seed lines 302a-302e.

Accordingly, row 602a has the highest average plant presence value, rows (602b, 602d, 602f) have average plant presence values that each include a near zero for single a seed line 302 for false gap (312a, 312b, 312c), and rows (602c, 602e) have average plant presence values near zero. False gaps (312a, 312b) when analyzing each seed line 302 individually or in isolation, can be mistaken as gaps between plots. By averaging the plant presence values by row 602 across field 300, the potential for mistaking false gaps (312a, 312b) as actual gaps is greatly reduced while the large contrast between rows corresponding to actual gap locations relative to other rows positioned in the middle of the plots is made apparent. Thus, in one embodiment, average plant presence values for each row 602 is compared to a plant presence value threshold. The plant presence value threshold can be the average plant presence value across field 300, can be computed relative to the plant presence values of neighboring or adjacent seed lines, and the threshold may also be arbitrarily chosen to be larger than values generally known to be associated with gaps. Since rows 602 corresponding to gap locations are associated with low average plant presence values, the locations of rows 602 with average plant presence values below the plant presence value threshold are identified as gap locations between plots.

The plant presence values can be compared to different plant presence value thresholds and at different points in gap identification 108. In one embodiment, thresholds can be first applied to the plant presence values to generate a bit map of field 300 of plant presence heat map 500. A bit map of plant presence heat map 500 may appear something like rows 302 in FIG. 6. In this example, values greater than a plant presence value threshold are assigned a value of 1 and values below are assigned a value of 0. The average plant presence values may also be determined first and later compared to the plant presence value threshold.

In an alternative embodiment, candidate gaps are determined based on plant presence values below a plant presence threshold. For example, candidate gaps can be determined by identifying multiple consecutive instances of field data below the plant presence threshold along a row. Here, all real gaps and false gaps (312a, 312b) are initially returned and identified as candidate gaps. Then, as discussed in more detail with respect to field characteristic data 110 below, information known about the field is used to eliminate or rule-out false gaps (312a, 312b) and confirm real gaps. For example, if all plots and gaps in field 300 are planted with approximately predetermined length, such as 20 feet in length, with predetermined real gaps between them, such as 2 feet in length, candidate gaps occurring between multiples of the predetermined length (length+real gap length), or candidate gaps that are of insufficient size (e.g., less than 2 feet in length) are removed from consideration. Candidate gaps meeting these criteria are confirmed as real gaps.

Thus, in one embodiment, gaps 304 are identified based on areas associated with low to zero plant presence in aggregated plant presence data 106 and their location is refined, as described in the next section, using information known about the field. In another embodiment, all potential gaps are identified based on areas associated with low to zero plant presence in aggregated plant presence data 106 and information known about the field is used to eliminate or rule-out false gaps and confirm real gaps.

Field Characteristic Data

Field characteristic data 110 is information known about a field that can be used to heuristically identify gaps in a seed line or information used to eliminate or rule-out locations on a seed line that may look like a gap based on low plant presence values. In a field, growers insert gaps between different genotypes of plants and it is common to plant an individual genotype in a single plot separated from adjacent plots by a gap. Though the length of the plots (or plot boundary measurement defined or provided by the grower) can vary, a common plot length is about 20 feet and gaps between adjacent plots are commonly around 2 ft in length and this information can be used to positively identify real gaps from areas of poor growth, for example, in the middle of a plot.

Accordingly, this information and other field characteristic data 110 can be used to identify, refine, or discount the weight of candidate gaps in the aggregated field data based on the location of a candidate gap relative to an expected gap location. Other examples of field characteristic data 110 are a predetermined or field standard plot and gap lengths, GPS/location/position data for plot and field boundaries, seed line length, seed line orientation/direction, total number of seed lines and/or plots, stage of growth of plants in respective plots (since some plots may have been planted before others), type of plant in each plot (since different plants have different growth rates and sizes), how many plots are planted at a particular time (similar to stage of growth), average plant separation, and other field parameters and plant characteristics. Field characteristic data 110 can also determined heuristically using various statistical tools and/or methods. For example, Hough transform can used to determine the orientation of the seed lines, which is used to determine the orientation of field, among other statistical methods.

In one embodiment, plot length data of field characteristic data 110 corresponding to common plot/gap lengths (or the gap/plot lengths identified by the grower if different, for example) can be used to identify, refine, or discount the locations of gaps. Based on the plot length data, an expected location of the gaps in field 300 can be determined and subsequently projected onto aggregated plant presence data 106. The plot length data, thus, can be used to identify the expected locations where gaps should appear. For example, a candidate gap relatively close to an expected gap (e.g., within a predetermined threshold length) can be identified as an actual gap. Conversely, a candidate gap located a length greater than the predetermined threshold length is likely a location associated with missing plants, not an actual gap between plots, and can be remove as a candidate gap. Additionally, the correct spacing between plots could also be auto-detected to identify gaps 304 from aggregated plant presence data 106 based on the length of the gap relative to the average plant separation in adjacent plots (or average separation for the field) and plant presence value.

Refinement

Refinement uses field characteristic data 110 to refine plot boundaries 112 (e.g., start and end points) associated with each identified gap 304 described above with respect to FIG. 6. Referring to FIG. 2, gap identification module 236 further receives field characteristic data 110 from system store 244 after performing gap determination 108, in one embodiment. Since growers and machines can be a little bit off when planting seed lines 302, the plot boundary or seed line can be automatically drawn by the gap identification module 236 for each individual plot to ensure an accurate mapping between field data 102 and the actual plants in each plot. For example, the length between gaps 304 as an average across all seed lines 302 can be used as a starting point. Then, the best gap in each individual seed line that is near a candidate gap location can be automatically identified by the gap determination module 236.

The best gap, in one embodiment, refers to an area of low plant presence values 104 with the greatest amount (or number) of characteristics or criteria defined for an ideal or expected gap based on field characteristic data 110. These characteristics or criteria can include at least the ideal or expected length of a gap, number of consecutive plant presence values below a threshold value defined for gaps, number of the same consecutive plant presence values below the threshold value, the location along a seed line corresponding to a multiple of the theoretical plot length plus the theoretical gap length, and so forth.

Figure 7:
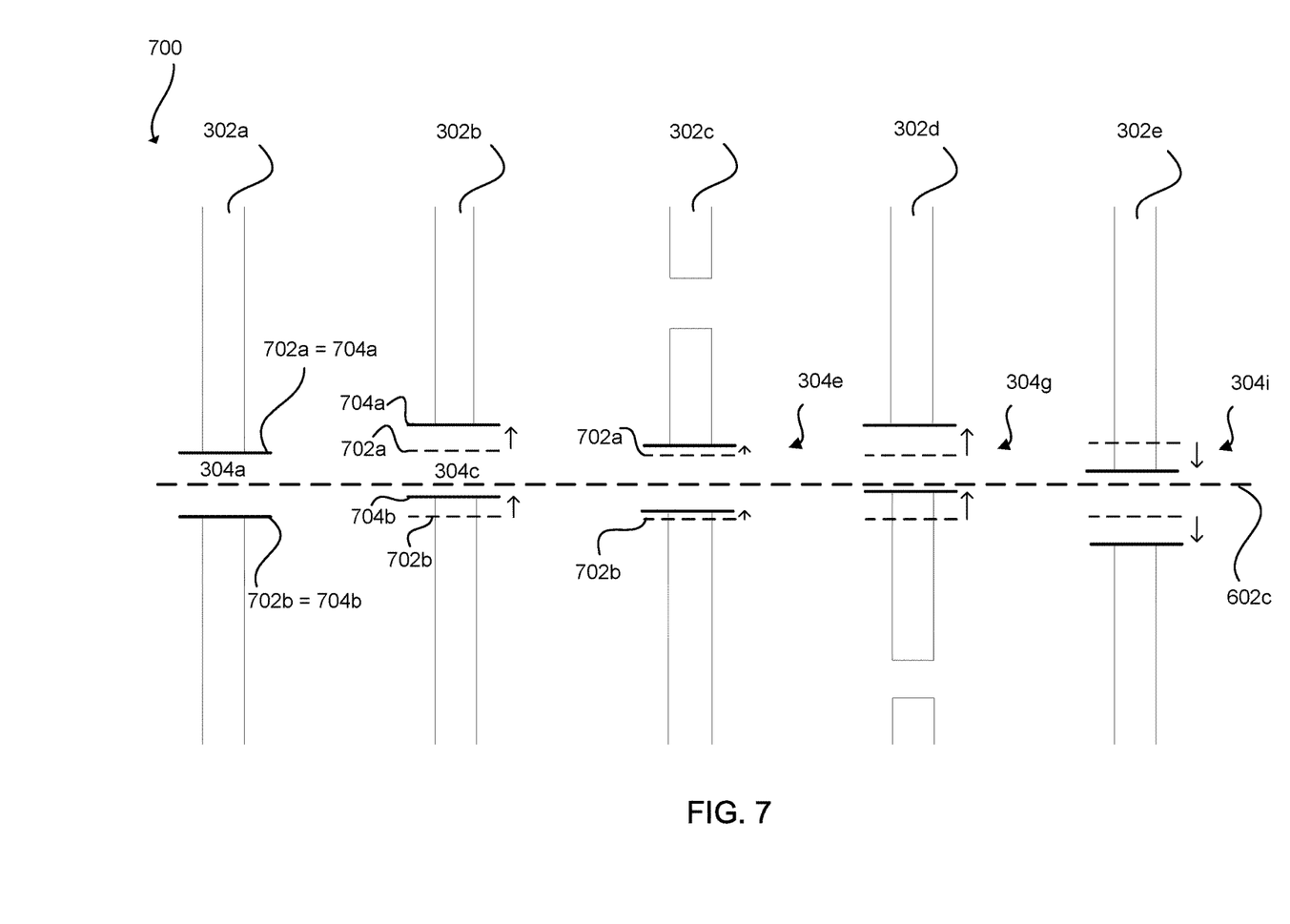
FIG. 7 shows an example of plot location refinement, in one embodiment.

FIG. 7 shows example process 700 for refining plot boundaries, in one embodiment. In this example, the start and end points of each plot can be refined using field characteristic data 110. Field characteristic data 110 includes the length and/or location of field boundaries (604a, 604b, collectively "604" corresponding to a line where seed lines 302 begin and end), expected plot length, and expected gap length. Field characteristic data 110 may further include the number of planted seed lines 302. In one embodiment, data aggregation module 204 arranges plant presence values 104 to reflect the corresponding shape of plots 302 in field 300 based on this known data. The gap identification module 236 then initially segments field 300 using field boundaries 604 (shown in FIG. 6), the expected plot length, and the expected gap length to roughly identify theoretical gap boundaries (702a, 702b, collectively "702") within each seed line 302.

Since the actual locations of gaps 304 may not perfectly correspond to theoretical gap boundaries 702 for each seed line 302 (e.g., based on differences in position data for plant presence values 104 in seed lines 302, poor planting, or other effects), the location of gap boundaries 702 can be refined based on plant presence value transitions, in one embodiment. For example, gap identification module 236 can analyze the plant presence values for plant presence value gradients within a threshold distance of each boundary 702 and adjust placement of each boundary 702 individually for each seed line 302. FIG. 7 shows differences between theoretical gap boundaries 702 and actual gap boundaries (704a, 704b, collectively "704") in seed lines 302. In this example, theoretical gap boundaries 702 are substantially equal to actual gap boundaries 704 for gap 304a in seed lines 302a and theoretical gap boundaries 702 are automatically adjusted to actual gap boundaries 704 for seed lines 302b, 302c, 302d, and 302e with arrows indicating the direction of the adjustment. Thus, in various embodiments, data across all (or at least a subset of) seed lines 302 is analyzed to determine the locations of gaps 304 and then each individual seed line 302 is analyzed to refine the actual gap boundaries 704.

Occasionally, no plot boundaries (or gap 304) can be identified nearby or within the threshold distance (e.g., as if the planter inadvertently planted straight through a location where a gap should have been located). In instances where no boundaries are identified, the expected or theoretical location for where a gap should be located, as identified using field characteristic data 110, can be assigned as a gap location. In one instance, the best gap closest to where a candidate gap should be can be used if there is no clear boundary, such as if there are weeds in a gap that increased the plant presence value for the gap and lowering any detectable plant presence value gradient.

User Assisted Method and Quality Assurance

At least portions of the above described process can be performed manually by a user. For example, instead of automatically applying field characteristic data 110 to identify gaps 304, data aggregation module 234 can generate a heat map 500 to allow a user to manually identify gaps 304 by providing an input to the field data analysis system 230. The fact that many seed lines are next to each other and the gaps should line up across all the seed lines can be a visual aid to a user in identifying gaps 304, as can be seen from FIG. 6. In this example, it would be apparent to a user looking at a plant presence value heat map of FIG. 6 that false gaps 312a, 312b, and 312c were not real gaps 304 since all real gaps line up perpendicularly across field 300. Accordingly, a user can identify beginning and end points for each plot and, since the gaps are located at predetermined lengths, a user can quickly determine the likely location of each gap.

Additionally, manual input by the user may also be used as an addendum to the automatic processes in the previous sections. In one embodiment, data aggregation module 234 generates heat map 500 and plot visualization module 240 presents heat map 500 to the user to receive an input corresponding to the beginning and end points for each seed line 302 (and perhaps the end of the seed line), and field data analysis system 230 determines the location of plots 304 using the user inputs and field characteristic data 110. In this example, the seed lines 302 of heat map are segmented into the one or more plots based on field characteristic data 110, such as plot length or/and gap length. In another embodiment, data aggregation module 204 arranges plant presence values 104 to reflect the corresponding shape of plots 302 for field 300 and gap identification module 236 segments field 300 using field boundaries 604 (shown in FIG. 6), the expected plot length, and the expected gap length to roughly identify theoretical gap boundaries 702, as described above. The heat map with identified theoretical gap boundaries 702 are presented to a user to adjust the location of gap boundaries 702 to actual gap boundaries 704. Thus, in various embodiments, field data analysis system 230 analyzes data across seed lines 302 to determine the locations of gaps 304 and a user analyzes each individual seed line 302 to manually refine the locations of the actual gap boundaries 704. In one embodiment, the user could select an area of field 300 that includes plots and gaps, such as by drawing a box around at least a portion of field 300. Using this area selected or highlighted by the user, gap identification module 236 can segment field 300 using field boundaries 604 (shown in FIG. 6), the expected plot length, and the expected gap length to roughly identify theoretical gap boundaries 702, as described above.

Data aggregation module 204 can, in one embodiment, arrange the plant presence values 104 in the shape of plots for field 300 based on the position data for the plant presence values and gap identification module 236 can prompt a user to identify the gap locations for a single seed line 302. Using the data for that seed line 302 provided by the user, gap identification module 236 may compare the plant presence values on each side of a gap boundary between a plot and a gap and determines a plant presence value threshold for field 300 based on a difference between the compared plant presence values on each side of the boundary. Gap identification module 236 can, thus, analyze the characteristics of the actual gap boundaries for a single seed line 302 that the user manually identified to subsequently identify other gap boundaries based similar characteristics or features among the other seed lines 302.

Alternatively, the user identification of the gap locations for a single seed line 302 can be used to refine the locations of the gaps in a previously segmented heat map. For example, data aggregation module 204 can arrange the plant presence values 104 in the shape of plots for field 300 based on the position data for the plant presence values and gap identification module 236 can segment field 300 using any method described above (e.g., based on plant presence value gradients, the expected location of the gaps based on the field characteristic data, and so forth), and prompt a user for input. In this embodiment, the user input corresponds to the manual of the gap locations by the user to adjust the location of gap boundaries 702 to actual gap boundaries 704 for a single seed line 302. Using the data for that seed line 302 provided by the user, gap identification module 236 can adjust the location of gap boundaries 702 to the actual gap boundaries 704 for the other seed lines 302. Gap identification module 236 can, thus, analyze the characteristics of the actual gap boundaries 704 for the seed line 302 that the user manually adjusted to identify similar characteristics or features among the other seed lines 302 to adjust their locations accordingly. Alternatively or additionally, gap identification module 236 analyzes the characteristics of the actual gap boundaries 704 for the seed line 302 that the user manually adjusted to compute and/or refine thresholds used to identify the gaps instead of having a fixed set of thresholds (i.e., preset of the field or all fields). Thus, the users refinements for one or more seed lines 302 are used to automate the refinement of the actual gap boundaries 704.

In another example, once the gap identification module 236 has identified the gaps 108, and therefore the individual plots, the gaps 304 and plots may be provided to a user for manual review. The manual reviewer may rate the identified gaps 108 and plots for accuracy, provide input to correct any errors they perceive, and/or flag a set of data including the identified gaps 108 and plots as having an error that should be escalated to a supervisor or reviewed by the farmer or other customer.

Seed Line Detection

In addition to identifying gaps in plots, the field data analysis system 230 is also capable of identifying seed lines 302 in fields, particularly identifying which plants are located in which seed lines 302. Identifying seed lines is of particular interest in the context of using UAVs to characterize the contents of a field, where at the outset, raw collected field data 102 may not be associated with particular seed lines, let alone plots.

The methods that may be used to identify seed lines are similar to those that may be used to identify gaps between plots. Rather than repeat this description, the entirety of the contents of the sections titled "Gap Identification," "Field Characteristic Data," "Refinement," and "Manual Method and Quality Assurance" can be re-used to identify seed lines in a field, rather than gaps along a seed line.

Briefly, aggregate plant presence values 106 can be used to identify semi-contiguous, often semi-linear strips of land within a field that contain at least a threshold amount of aggregate plant presence value, as well as interstitial strips of land having less than the threshold amount of aggregate plant presence value. As above, generally seed lines will be arranged approximately parallel to each other, of approximately a same seed line length, and generally spaced approximately a uniform distance apart from each other. Thus, similarly to the case for gaps, including false gaps and real gaps, the presence of extraneous plants such as weeds may mean that the aggregate presence values 106 include both false seed lines and real seed lines which the system 230 is configured to disambiguate.

More specifically, the same techniques for distinguishing false and real gaps can be used, including identifying false and real seed lines, identifying candidate seed lines which are then refined or eliminated from consideration, identifying an initial layout of expected seed lines and then refining that initial version, and identifying the "best" possible seed line location when there is no clear indication as to where the seed line should be.

Also as with the gap identification process, seed line identification may also use field characteristic data to identify, and refine seed line locations. Examples of field characteristic data can again include expected seed line locations, expected lengths, and expected spacings between seed lines, GPS/location/position data for plot and field boundaries, total number of seed lines, stage of growth of plants in respective plots or seed lines (since some plots or seed lines may have been planted before others), type of plant in each plot or seed lines (since different plants have different growth rates and sizes), how many plots or seed lines are planted at a particular time (similar to stage of growth), average plant separation, and other field parameters and plant characteristics.

Visualization/UI

Field data analysis system 202 further includes plant modeling module 238, plot visualization module 240, and plot analysis module 242 that provide field data 102 and/or plant presence values 104 to allow a user to analyze various growth metrics of plants in field 300 in one embodiment. Plant modeling module 238 generates a three-dimensional virtual model of an individual plant from field data 102. More information for generating plant virtual models can be found in U.S. Provisional Applications No. 62/163,147 and No. 62/279,599, which are incorporated by reference herein in their entirety.

Plot visualization module 240 uses the plant virtual models and/or aggregated plant presence data 106 of field 300 to generate a graphical user interface for user manual analysis. The virtual plant models of many plants in a plot allows in depth visual analysis, such as stand count, stand quality, rate of seedling emergence at a particular time, plant height, and so forth, in perspective with other plants in a plot. Additionally, plot visualization module 240 can render a plot image library containing all field data 102 for field 300 and plot reconstructions for every plot.

Further, data aggregation module 234 can generate a mapping between the heat map and field data 102 to allow a user to select a portion of the plot via the heat map and view, for example, the image captured or other field data 102 corresponding to the selected portion of the heat map. The heat map may include an indication of individual images, individual plants, and/or raw data (e.g., greenness, plant height, etc.) that, when selected or "moused over," cause the raw data/actual image corresponding to the selected image or plant to be displayed in an overlay, for example, from the heat map.

Plot analysis module 242 performs (or enables a user to perform) various analytics on the data from each plot to generate tabular data and statistics, such as plant count, plant spacing, building canopy height distributions, leaf area, and other key physiological parameters.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The invention claimed is:

1. A method comprising:
receiving, from a camera mounted to a vehicle navigating through the field, one or more images representing field data, the field including a plurality of seed lines and one or more plots within the plurality of seed lines;
determining a plant presence value for each instance of field data, each instance of field data corresponding to a portion of the field and each plant presence value corresponds to a portion of the field and numerically representing a measure of plant matter density associated with each portion of the field;
identifying plant presence values below a threshold density as candidate gaps;
comparing plant presence values associated the candidate gaps to plant presence values associated with portions of the field adjacent to the candidate gaps to eliminate candidate gaps associated with plant presence values within a threshold difference of the adjacent plant presence values;
identifying remaining candidate gaps as the one or more gaps between plots of the plurality of plots within the field; and
segmenting the plant presence values into the one or more plots based on the one or more gaps.

2. The method of claim 1, wherein identifying remaining candidate gaps as the one or more gaps between plots further comprises:
determining an average row plant presence value for each row of a plurality of rows perpendicular to the plurality of seed lines, the average row plant presence value including at least one plant presence value from two or more parallel seed lines of the plurality of seed lines; and
identifying one or more rows with an average row plant presence value below an average row plant presence value threshold as the one or more gaps.

3. The method of claim 1, wherein the field data is at least one of thermal image data, color image data, plant height data, or plant volume data received from at least one of a vehicle or unmanned aerial vehicle (UAV) capturing the field data.

4. The method of claim 1, wherein the field data is image data captured using a camera, and wherein determining the plant presence value for each instance of the field data further comprises:
determining an amount of green colored pixels in each instance of the field data; and assigning the plant presence value to each instance of field data based at least in part on the amount of green colored pixels in each instance of field data.

5. The method of claim 4, wherein the amount of green pixels is at least one of a total number of green pixels, a percentage of green pixels, or a ratio of green pixels to brown pixels in the field data.

6. The method of claim 1, further comprising:
obtaining position data for each instance of field data, the plant presence values being arranged as the function of position within the field based on the obtained position data.

7. The method of claim 6, wherein the plant presence values are arranged into a plant presence heat map representing varying measures of plant matter density for the field, wherein dark areas on the plant presence heat map represent portions of the field with low plant matter density and light areas on the plant presence heat map represent portions of the field with relatively high plant matter density.

8. The method of claim 1, wherein the field data is at least one of position data for plots in the field provided by a grower, field boundary data, plot length, gap length, or seed line length.

9. The method of claim 1, wherein the camera is oriented non-orthogonally to the surface of the field.

10. The method of claim 1, wherein each image captured by the camera represents a portion of the plot.

11. A non-transitory computer readable storage medium including instructions that, when executed by a processor, cause the processor to:
receive, from a camera mounted to a vehicle navigating through the field, one or more images representing field data, the field including a plurality of seed lines and one or more plots within the plurality of seed lines;
determine a plant presence value for each instance of field data, each instance of field data corresponding to a portion of the field and each plant presence value corresponds to a portion of the field and numerically representing a measure of plant matter density associated with each portion of the field;
identify plant presence values below a threshold density as candidate gaps;
compare plant presence values associated the candidate gaps to plant presence values associated with portions of the field adjacent to the candidate gaps to eliminate candidate gaps associated with plant presence values within a threshold difference of the adjacent plant presence values;
identify remaining candidate gaps as the one or more gaps between plots of the plurality of plots within the field; and
segment the plant presence values into the one or more plots based on the one or more gaps.

12. The non-transitory computer readable storage medium of claim 11, wherein identifying remaining candidate gaps as the one or more gaps between plots further comprises:
determining an average row plant presence value for each row of a plurality of rows perpendicular to the plurality of seed lines, the average row plant presence value including at least one plant presence value from two or more parallel seed lines of the plurality of seed lines; and
identifying one or more rows with an average row plant presence value below an average row plant presence value threshold as the one or more gaps.

13. The non-transitory computer readable storage medium of claim 11, wherein the instructions that, when executed by the processor, further cause the processor to:
obtain position data for each instance of field data, the plant presence values being arranged as the function of position within the field based on the obtained position data.

14. The non-transitory computer readable storage medium of claim 11, wherein identifying the one or more gaps in the aggregated plant presence values further comprises:
identifying plant presence values below a plant presence value threshold as candidate gaps;
comparing characteristics of the candidate gaps to field characteristic data associated with the field to eliminate candidate gaps with characteristics failing to match the field characteristic data within a threshold; and
identifying remaining candidate gaps as the one or more gaps between plots of the plurality of plots within the field.

15. The non-transitory computer readable storage medium of claim 11, wherein the field data is at least one of position data for plots in the field provided by a grower, field boundary data, plot length, gap length, or seed line length.

16. The non-transitory computer readable storage medium of claim 11, wherein the field data is at least one of thermal image data, color image data, plant height data, or plant volume data received from at least one of a vehicle or unmanned aerial vehicle (UAV) capturing the field data.

* * * * *